United States Patent [19]
Zimmerman

[11] 3,893,516
[45] July 8, 1975

[54] TOOL CONNECTING APPARATUS FOR TRACTORS

[76] Inventor: Emil F. Zimmerman, Richardton, N. Dak. 58652

[22] Filed: Apr. 8, 1974

[21] Appl. No.: 458,670

Related U.S. Application Data

[63] Continuation-in-part of Ser. No. 380,209, July 18, 1973, abandoned.

[52] U.S. Cl. ............................. 172/273; 172/297
[51] Int. Cl.² .................. A01B 51/00; A01B 63/102
[58] Field of Search .......... 172/273, 276, 297, 298, 172/300–304, 307, 308, 491, 275; 214/131 R, 131 A; 280/490 R, 490 A, 472, 473

[56] References Cited
UNITED STATES PATENTS

| | | | |
|---|---|---|---|
| 1,870,740 | 8/1932 | Leiter | 172/273 X |
| 1,945,882 | 2/1934 | Collins | 172/297 X |
| 2,444,321 | 6/1948 | Wooldridge | 172/321 X |
| 2,505,280 | 4/1950 | Ellinghuysen | 172/276 X |
| 2,528,144 | 10/1950 | Horn | 172/321 X |
| 2,626,553 | 1/1953 | Newlin | 172/491 X |
| 2,941,606 | 6/1960 | Gillette | 172/273 |
| 2,962,104 | 11/1960 | Antici | 172/273 |
| 3,092,187 | 6/1963 | Hunter et al. | 172/297 |
| 3,507,335 | 4/1970 | Nokleby | 172/300 |

*Primary Examiner*—Edgar S. Burr
*Assistant Examiner*—Paul T. Sewell
*Attorney, Agent, or Firm*—H. Dale Palmatier; James R. Haller

[57] ABSTRACT

An easily attachable and detachable tool-mounting apparatus for mounting a plurality of earth-working tools to a tractor provided with a hydraulically-actuated lift apparatus. The tool-connecting apparatus, which comprises outwardly extending booms to which are connected tool-mounting bars parallel thereto, is carried by the lift apparatus. To the forward portion of the lift apparatus is connected another tool-mounting bar. The tool-connecting apparatus is borne by the tractor solely through the hydraulically-actuated lift apparatus, whereby the tool-connecting apparatus may be easily raised and lowered, and thus may be easily attached and detached from the tractor. Means for swinging the outwardly extending booms out of the way of the tractor wheels are also provided.

10 Claims, 5 Drawing Figures

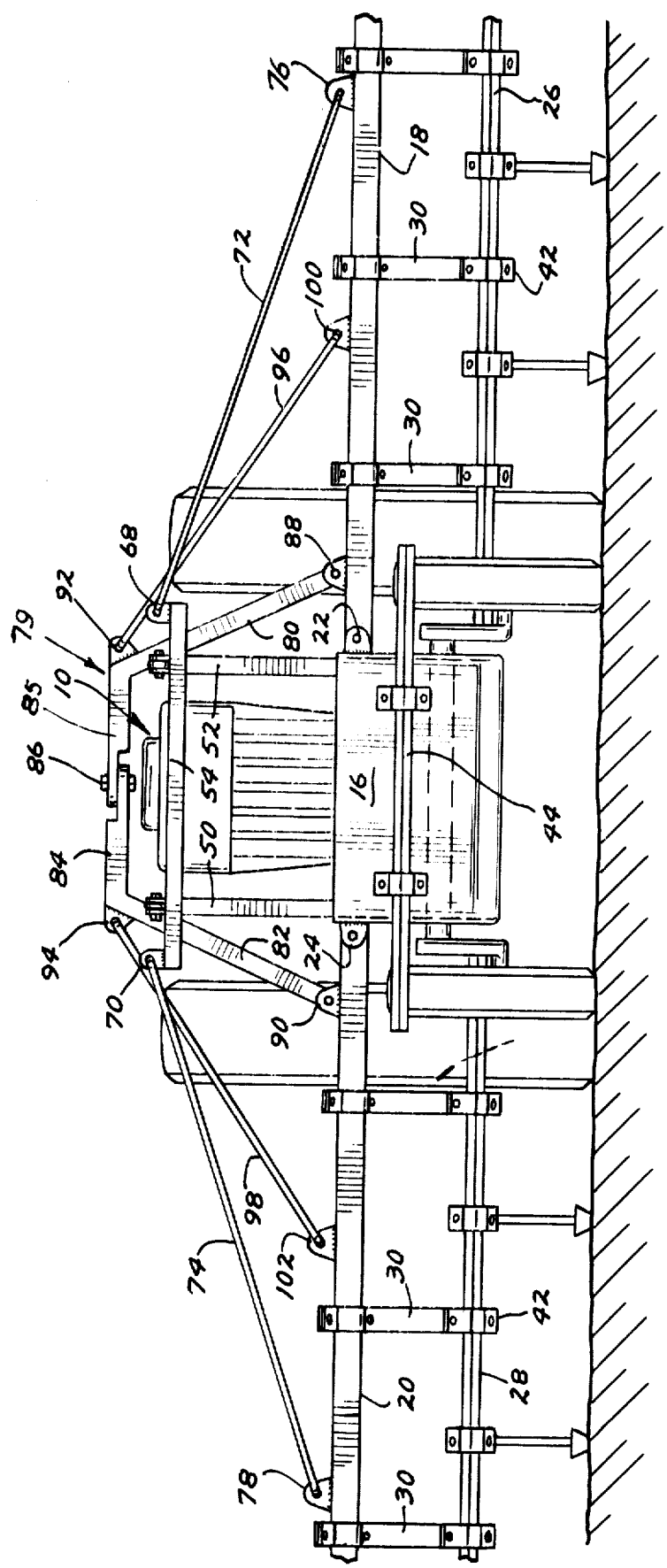

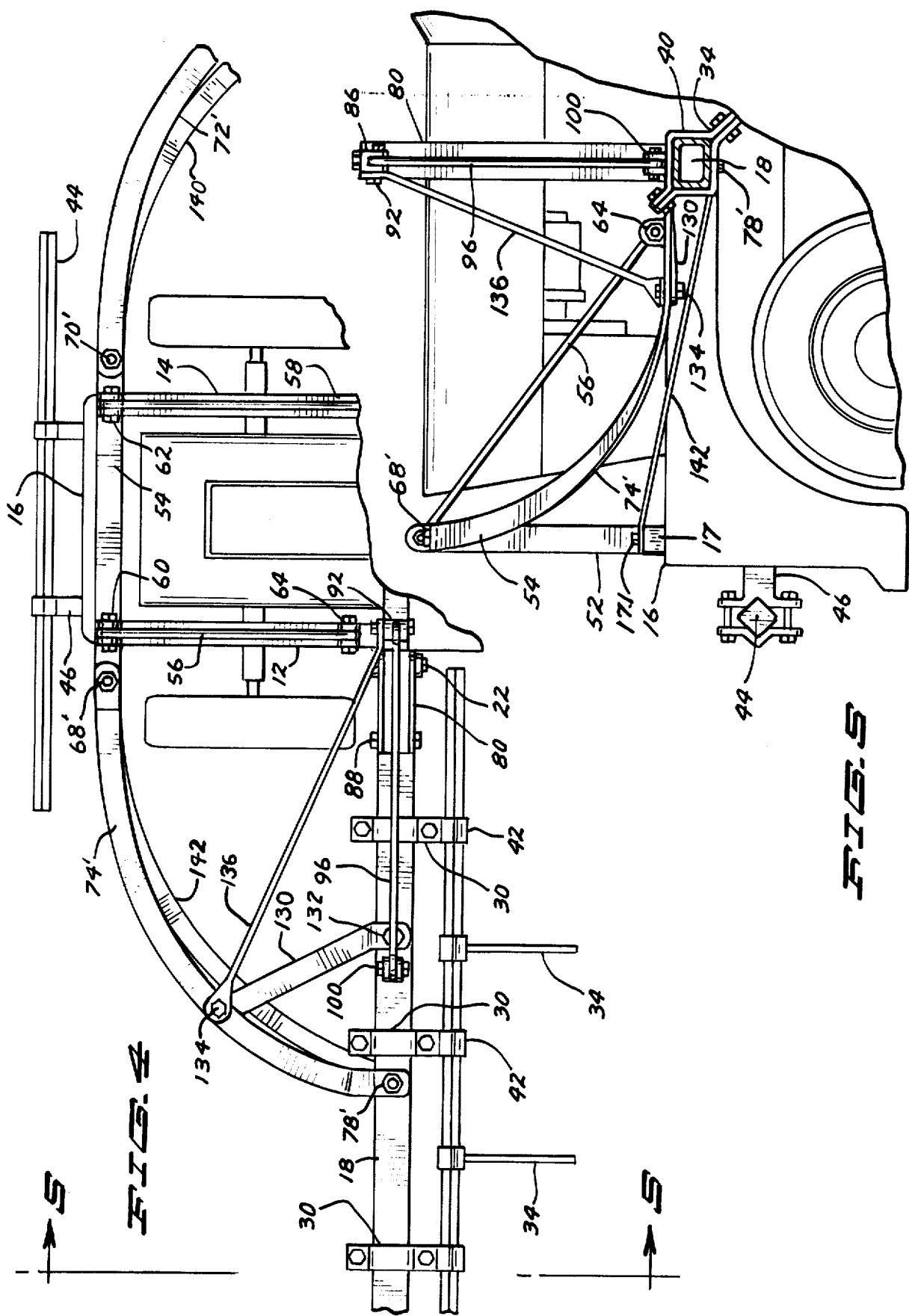

TOOL CONNECTING APPARATUS FOR TRACTORS

This is a continuation-in-part of my U.S. application Ser. No. 380,209, filed July 18, 1973, now abandoned.

BACKGROUND OF THE INVENTION

The present invention relates to agricultural equipment in general, and particularly relates to the attachment of earth-working equipment to tractors.

With the advent of large and often incorporated farms, farming equipment has undergone improvement to permit the efficient working of vast acreages of land. For example, whereas in early days only a few crop rows could be worked by a single pass of a tractor, nowadays it is common for many crop rows to be worked at a single pass of the tractor. To accomplish this, the art has made use of tool assemblies having long, laterally extending tool bars capable of carrying many individual tools, the entire bar being carried laterally along crop rows by tractors which themselves have been made larger and more powerful. The tool-mounting bars ordinarily are themselves mounted to the tractor frame, either in front of or to the rear of the tractor. Often tool-mounting bars may themselves be equipped with wheels of adjustable height, and such bars may be attached to a mounting bracket at the rear of a tractor in much the same way that a boat trailer is attached to a car. Since a single tractor will ordinarily be used at different times in conjunction with different tools such as cultivators, seeders, etc., it is highly desirable that tool-mounting bars be easily attached to and removed from the tractor. Large tool assemblies are often quite heavy, and it is thus desired that a minimum of lifting or other movement be required in the attaching or detaching procedure. Often, the tool assemblies are manually lifted onto an elevated platform or the like so that strain upon the connection of the equipment to the tractor is reduced, facilitating attachment or removal of the equipment to the tractor. Particularly where large or exceedingly heavy pieces of equipment are employed, however, as above described, this procedure is difficult.

BRIEF DESCRIPTION OF THE INVENTION

Briefly, the present invention relates to a tool-connecting apparatus for mounting on a tractor wherein the latter is provided with a hydraulically-actuated lift apparatus having co-acting lifting arms extending forwardly along the sides of the tractor and joined forwardly of the tractor by a transverse lifting beam. One such hydraulically activated lifting mechanism is disclosed in my co-pending Pat. application Ser. No. 361,517, filed May 18, 1973 now U.S. Pat. No. 3,844,435. The connecting apparatus of the invention is borne by the tractor solely through the lift apparatus and comprises a pair of detachable, laterally extending longitudinal booms pivotally attached respectively to the lifting arms intermediate the length of the tractor, a pair of longitudinal tool-mounting bars attached respectively to the booms in parallel relationship thereto, a detachable frontal tool-mounting bar extending laterally across the front of the tractor and supported by the lift apparatus, and means supporting the booms against downward and rearward movement thereof with respect to the lift apparatus. As a result, the booms, the frontal tool bar and support means are all raised and lowered by raising and lowering the hydraulically-actuated lift apparatus, thus permitting the tool-connecting apparatus to be attached and detached from the tractor with ease.

BRIEF DESCRIPTION OF THE DRAWING

FIG. 3 is a front elevational view of the apparatus of the invention shown mounted on a tractor as in FIGS. 1 and 2;

FIG. 4 is a top view, partially broken away, of a tractor equipped with a variational form of the tool-connecting apparatus of the invention; and FIG. 5 is a broken away side elevational view taken along line 5—5 of FIG. 4.

DESCRIPTION OF THE PREFERRED EMBODIMENT

Figure 1:
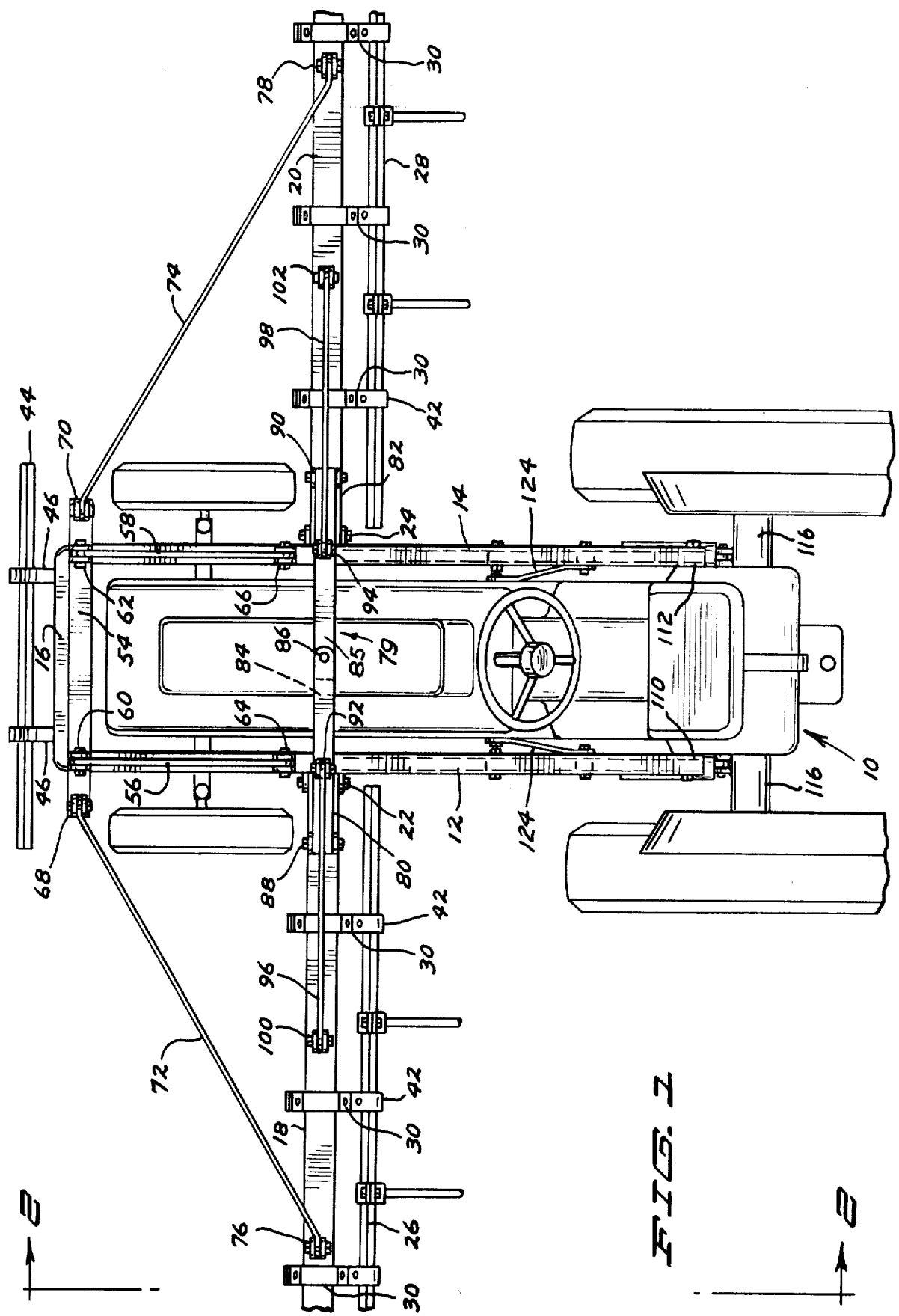
FIG. 1 is a top view, partially broken away, of a tractor to which is mounted the tool-connecting apparatus of the invention.
Figure 2:
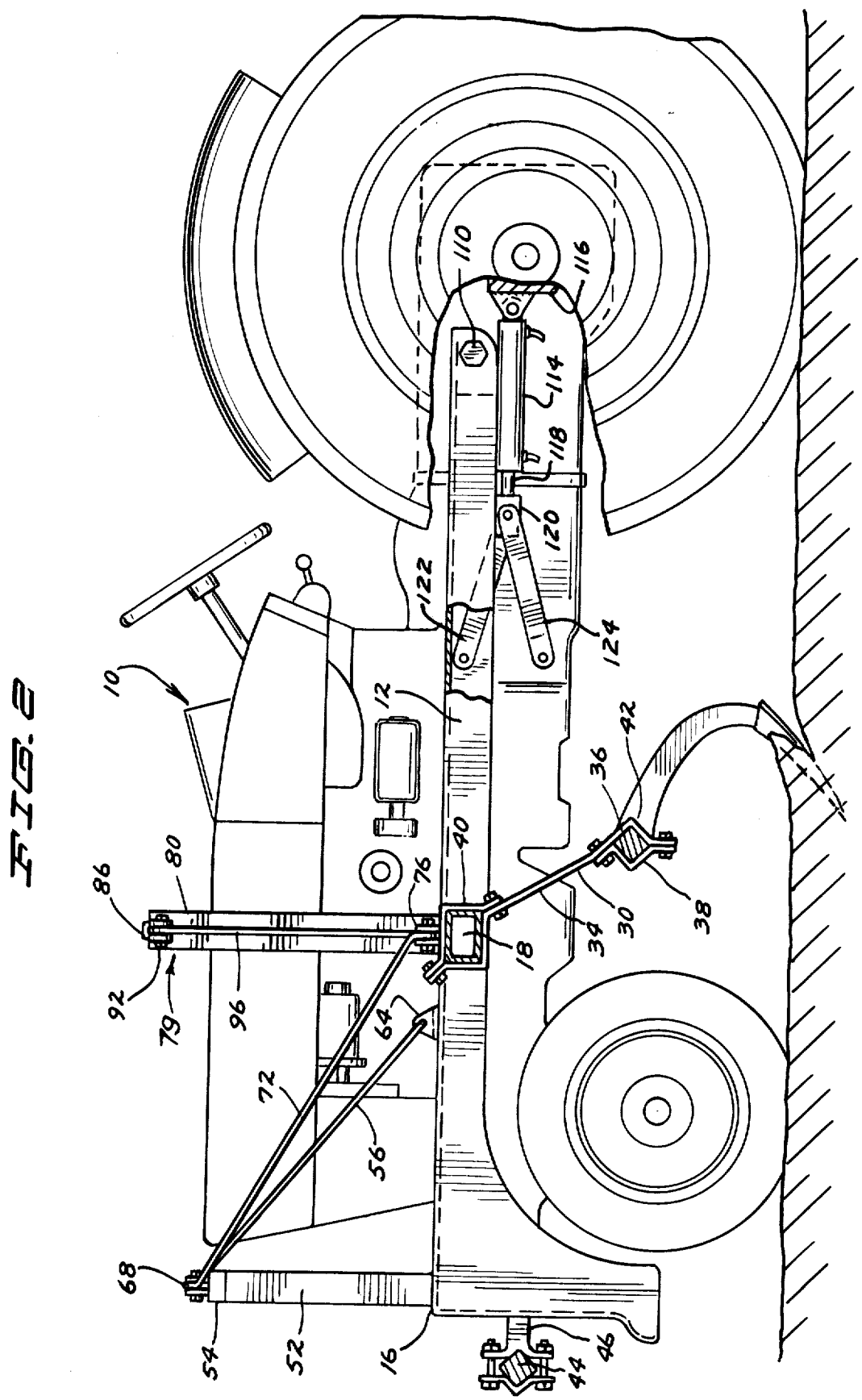
FIG. 2 is a side elevational view of the apparatus of the invention shown mounted on a tractor as in FIG. 1.

Referring to the drawing, a tractor 10 is equipped with a hydraulic lift mechanism comprising forwardly extending, co-acting lifting arms 12 and 14 which are joined forwardly of the tractor by a transverse lifting beam 16. The rearward ends of the lifting arms 12 and 14 are swingably connected at 110, 112, respectively, to the tractor frame, as shown best in FIG. 2, so that the lifting arms may swing in substantially vertical planes. A hydraulic cylinder 114 is swingably mounted at one end to each rear axle housing 116 of the tractor, and the cylinder extends in a forwardly direction as shown best in FIG. 2. The cylinder 114 has a piston 118 emerging from its forward end and which is extendible and retractable in forwardly and rearwardly directions, respectively. The piston 118 is equipped at its forward end with a mounting block 120. A link 122 is pivotally connected at one end to the mounting block 120 and extends forwardly and upwardly for pivotal connection to the adjacent lifting arm (12 in FIG. 2) A second link 124 is pivotally connected at one end to the mounting block and extends forwardly and downwardly for pivotal connection to the tractor frame, the links 122 and 124 forming an oblique angle with one another. When the lifting arms are in their lowered positions, as depicted in FIG. 2, the direction of forward thrust of the piston 118 passes within the oblique angle formed by the links to force the lifting arms to swing upwardly about their connections 110, 112 to the tractor frame. As the lifting arms are thus elevated, the direction of force of each piston continues to be directed within the oblique angle formed by the linkds 122, 124, the cylinder swinging upwardly about its mounting to the axle housing.

Extending laterally outwardly from the lifting arms 12 and 14 are detachable, laterally extending, longitudinal booms 18 and 20 which are attached to the lifting arms by pin-in-hole hinged connectors 22 and 24. The booms 18 and 20 preferably are strong tubular steel members, but may be made of wood or other material depending upon the strength required. Each of hinged connections 22 and 24 permits the booms to be readily attached to and detached from the respective lifting arms 12 and 14 by means of a removable pin passing through orifices in mating ears carried by the booms and the lifting arms. The hinged connectors further permit the booms to be raised and lowered as needed.

Carried below and slightly to the rear of the booms 18 and 20 are tool-mounting bars 26 and 28, which extend parallel to the booms and which are attached thereto by bracket members designated generally as 30. The tool-mounting bars, which may be of tubular steel, are preferably rectangular in cross section and are adapted to have earth-working tools, such as plowshares and the like, attached along the length thereof in a manner known to the art. The brackets 30 (FIG. 2) may comprise a rigid steel strap 34 having ends 36 and 38 adapted to fit partially about the peripheries of the boom and tool-mounting bar and are rigidly attached to the strap 34 by means of bolts or the like. The illustrated bracket 30 may be replaced by more sophisticated equipment, such as hydraulically-actuated lifting bars (not shown) which will permit the various tools to be raised and lowered with respect to the boom, or otherwise controlled, as desired. A detachable, frontal tool-mounting bar 44 which extends laterally across the front of the tractor is attached to the transverse lifting beam 16 by means of bolts 46 or like attachments.

Attached to the forward ends of the co-acting hydraulically-actuated lifting arms 12 and 14 by means of upstanding supports 50 and 52 is a transverse laterally extending support 54 which itself may be of tubular steel or the like. Supporting arms 56 and 58 are attached at 60 and 62 to the outwardly extending ends of the support 54, and extend downwardly and rearwardly for attachment at 64 and 66 to the respective lifting arms 12 and 14, thus restraining the transverse support 54 from rearward movement with respect to the tractor. Also attached to outwardly extending arms of the transverse support 54 by means of hinge attachments 68 and 70 are support arms 72 and 74 which extend downwardly and outwardly for hinged attachment to the outward reaches of the booms 18 and 20 through hinge attachments 76 and 78. The support arms 72 and 74 serve to restrain the booms from rearward movement with respect to the lifting mechanism and also serve to restrain the booms from downward movement.

Booms of the type described may be supplied with gauge wheels (not shown) upon which the booms or tool-mounting bars may ride during the earth-working operation. Gauge wheels serve to support the booms or the tool-mounting bars in their normal, horizontal position, and also serve to maintain the proper height of these members so that the earth-working equipment may be maintained at a proper height with respect to the ground. Gauge wheels, and their operation, are known to the art and need not be described in detail here. When particularly long booms are employed, however, and particularly in the absence of gauge wheels, a superstructure may be included in the tool-connecting apparatus of the invention to maintain the booms (and the tool-mounting bars connected thereto) at the proper height. An inverted U-shaped yoke 79 spanning said lifting arms comprises upstanding legs 80 and 82 having inwardly turned upper ends 84 and 85 joined through bolt attachment 86. The legs 80 and 82 are joined at their lower ends 88 and 90 to the booms 18 and 20 adjacent their respective connections 22 and 24 to the hydraulically-actuated lifting arms 12 and 14. To the upper portions of the legs 80 and 82 are connected, by means of hinge connections 92 and 94, supporting braces 96 and 98 which extend laterally downward for connection through hinge connectors 100 and 102 to the outer reaches of the respective booms 18 and 20, thus providing a rigid superstructure which is connected to the tractor only through booms 18 and 20.

As noted above, the tools or implements which are mounted on the tool-mounting bars of the apparatus of the invention may be provided with auxiliary controls for precisely adjusting height, turning the implements on and off where appropriate, etc., and these controls may be hydraulically-actuated and may be operable from the cab of the tractor. Further, the booms and tool-mounting bars of the invention may be of any convenient length, but it is desired that the frontal tool bar 44 be of sufficient length as to pass over points on the surface of the ground being worked which are also passed over by the inner ends of the laterally outwardly extending tool-mounting bars 26 and 28 so that an unbroken sequence of crop rows may be worked simultaneously.

Thus, the present invention provides a tool-connecting apparatus which is borne substantially solely by the hydraulic lift apparatus of a suitably equipped tractor and which is raised and lowered simply by raising and lowering the hydraulic lift apparatus. To detach the tool-connecting apparatus from a tractor, the hydraulically-actuated lift apparatus is raised slightly to permit the tool-connecting apparatus to rest upon slightly elevated surfaces such as blocks or the like in a storage yard. The lift apparatus is then lowered slightly to remove tension on the boom attachments 22 and 24, whereupon these attachments, and attachments 68 and 70, may be undone as by pulling the hinge pins of these attachments. The frontal tool bar 44 may be detached in similar fashion by removing the tension on connectors 46 and then undoing these connectors. The procedure is reversed in order to attach the tool-connecting apparatus to the tractor. The yoke 79, which as above described is attached only to the booms 18 and 20, remains with the booms after detachment thereof from a tractor. The bolt 86 located at the top of the yoke may ride in slotted holes so that the tension which is placed on the supporting braces 96 and 98 may be adjusted, thereby permitting adjustment of the height of the outer reaches of booms 18 and 20. By virtue of the fact that the front wheels of the tractor are in a leading position with respect to tools carried by the tool bars 26 and 28, the front wheels of the tractor serve as appropriate guides for maintaining the tools mounted on the various tool bars in their proper position with respect to the field being worked.

In the variation of the invention shown in FIGS. 4 and 5, the support arms 72 and 74 may take the form of strong metal straps 72' and 74'. Each strap is attached (at 78' in FIG. 4) at one of its ends to a boom intermediate the boom ends, and curves generally forwardly, upwardly and inwardly for horizontal swinging attachment (at 68', 70') to an outwardly extending end of the support 54. Struts 140 and 142 also join the booms to the lifting beam 16. Each strut is swingably connected at one end to lateral extension 17 of the beam 16 at respective connecting points 17.1 on the generally vertical axes passing through the attachments 68', 70', respectively, and at its other end swingably to the boom at connections 78'. The latter attachments permit the booms (if otherwise unrestrained) and their attached straps to pivot about generally vertical axes passing through the attachments 68', 70'. The booms may thus be swung out of the way of the tractor wheels so that (after disconnecting the straps from the support 54) the tractor may be driven from between the booms. Each of a pair of additional strap sections 130 may be mounted at one of its ends to a respective boom at a point 132 (FIG. 4) spaced along the boom from the attachment 78', and at its other end to a point 134 intermediate the strap ends to lend rigidity to the connection between the strap and boom. Additional support 136, extending between connection 92 on the yoke 79 and the connection 134, also helps support the boom 18.

The straps 72', 74', the struts 140 and 142, and their connections to the booms at one end and the support 54 and beam 16 at the other, are desirably of sufficient strength so as to support the weight of the booms 18, 20, when the booms are otherwise disconnected from the tractor, the booms and connected straps and struts thus being swingable about the attachments 68', 70', and 17.1. If desired, the attachments 78' (FIG. 4) between the strap and strut, and boom may also permit the boom to be swung about a generally vertical axis through the latter attachment. When employing the straps 72', 74' and struts 140, 142, the U-shaped yoke 79 may be, and desirably is, omitted.

During an earthworking operation, such as plowing, the straps 72', 74' and struts 140, 142 restrain rearward and downward movement of the booms with respect to the tractor. When the tool-connecting apparatus is to be removed from the tractor, tension is first relieved on the boom attachments 22 and 24 by lowering the apparatus upon an appropriate supporting surface, as previously described. The attachments 22, 24 are then easily uncoupled, as by pulling hinge pins, and the additional supports 136, if used, are also disconnected. The booms, which are now connected to the tractor solely through the straps 72', 74' and struts 140, 142 are then elevated slightly by raising the hydraulic lift apparatus, and the booms are swung outwardly, out of the path of the tractor tires, about the vertical axes through attachments 68', 70', and 17.1. By again resting the apparatus on a supporting surface, such as the ground, stress is relieved from the connections 68', 70', 17.1, and these connections can then be uncoupled, leaving the tool-connecting apparatus completely disconnected from, and out of the way of, the tractor. The forward strap and strut ends, however, remain appropriately spaced and oriented for easy re-connection to the tractor at a later time.

While I have described preferred embodiments of the present invention, it will be understood that various changes, adaptations and modifications may be made therein without departing from the spirit of the invention and the scope of the appended claims.

What I claim is:

1. Tool-connecting apparatus for mounting on a tractor provided with a hydraulically-actuated lift apparatus having co-acting lifting arms pivotally attached to the rear of the tractor for upward and downward swinging movement and extending forwardly along the sides of the tractor and joined forwardly thereof by a transverse lifting beam, said tool-connecting apparatus being borne by the tractor solely through said lift apparatus and comprising:

a. a pair of longitudinal booms respectively extending transversely outwardly at the sides of the tractor rearwardly of the front wheels and having inner ends removably attached respectively to said lifting arms intermediate the length of the tractor;

b. a pair of longitudinal tool-mounting bars attached respectively to said booms in parallel relationship thereto;

c. a detachable, frontal tool-mounting bar extending laterally across the front of said tractor and supported by said lift apparatus; and d. means supporting the booms against rearward movement thereof with respect to the lift apparatus; whereby said tool-connecting apparatus is raised and lowered by raising and lowering said lift apparatus, permitting the tool-connecting apparatus to be attached to and detached from the tractor with ease.

2. The tool-connecting apparatus of claim 1 including a laterally extending support attached to and carried above said transverse lifting beam, and including first and second pairs of support arms, said first pair of support arms joining said support respectively to respective lifting arms to restrain rearward movement of said support, and said second pair of support arms joining said support to said respective booms to restrain downward and rearward movement thereof with respect to said lift apparatus.

3. The tool-connecting apparatus of claim 1 including an inverted U-shaped yoke extending laterally over said tractor and having its ends joined respectively to said booms adjacent the attachment of the latter to said lifting arms, and including a pair of supporting braces respectively joining said booms at outwardly spaced points therealong to respective points along said yoke to restrain downward movement of said booms with respect to said lifting arms.

4. Tool-connecting apparatus for mounting on a tractor provided with a hydraulically-actuated lift apparatus having co-acting lifting arms pivotally attached to the rear of the tractor for upward and downward swinging movement and extending forwardly along the sides of the tractor and joined forwardly thereof by a transverse lifting beam, said tool-connecting apparatus being borne by the tractor solely through said lift apparatus and comprising:

a. a pair of detachable, logitudinal booms respectively extending transversely outwardly at the sides of the tractor rearwardly of the front wheels and having inner ends pivotally attached respectively to said lifting arms intermediate the length of the tractor;

b. a pair of longitudinal tool-mounting bars attached respectively to said booms in parallel relationship thereto on each side of said tractor;

c. a detachable, frontal tool-mounting bar extending laterally across the front of said tractor and supported by said transverse lifting beam;

d. a laterally extending support attached to and carried above said transverse lifting beam, and including first and second pairs of support arms, said first pair of support arms joining said support rigidly to said respective lifting arms to restrain rearward movement of said support, and said second pair of support arms extending laterally downwardly and rearwardly to join said support to said respective booms at outwardly spaced points therealong to restrain downward and rearward movement of said booms with respect to the lifting apparatus;

e. an inverted, U-shaped yoke extending laterally over said tractor and having its ends joined respectively to said booms adjacent the attachment thereto to said lifting arms, and including a pair of supporting braces respectively joining said booms at respective outwardly spaced points therealong to respective points along said inverted U-shaped yoke spaced upwardly from its connections to said booms to restrain downward movement of said booms with respect to said tractor; whereby said tool-connecting apparatus may be raised and lowered by raising and lowering said lift apparatus, thus permitting said tool-connecting apparatus to be attached and detached from said tractor with ease.

5. A tool-connecting apparatus for mounting on a tractor provided with a hydraulically-actuated lift apparatus having co-acting lifting arms pivotally attached to the rear of the tractor for upward and downward swinging movement and extending forwardly along the sides of the tractor and joined forwardly of the tractor by a transverse lifting beam, the tool-connecting apparatus being borne by the tractor solely through the lift apparatus and comprising:
   a. a pair of detachable, longitudinal booms extending transversely outwardly from, and connected to, the lifting arms intermediate the length of the tractor;
   b. a pair of longitudinal, tool-mounting bars attached respectively to, and in parallel relationship with, the booms on each side of the tractor;
   c. a transversely extending support attached to and carried above the transverse lifting beam, and means supporting the latter support against rearward movement with respect to the hydraulically-actuated lifting arms; and
   d. a pair of supporting straps, each connected upwardly one end to a respective boom and extending upwaardly and forwardly for pivotal attachment to the transversely extending support, the latter attachment permitting each boom and its associated strap to swing about a generally vertical axis through said attachment
whereby the tool-connecting apparatus may be raised and lowered by raising and lowering the hydraulically-actuated lifting arms, thus permitting the tool-connecting apparatus to be attached to and detached from the tractor with ease, and whereby the booms may be swung outwardly from the tractor to permit the tractor to pass therebetween.

6. The tool-connecting apparatus of claim 4 wherein the second pair of support arms are strong metal straps pivotally connected to the laterally extending support so as to permit each strap and the boom to which it is connected to swing, when otherwise unrestrained, about a generally vertical axis passing through the connection of the strap to the laterally extending support, whereby the booms may be swung out of the way of the tractor when the tool-connecting apparatus is detached from th tractor.

7. The tool-connecting apparatus according to claim 6 wherein each metal strap is rigidly connected at its lower, rearward end to a boom, and wherein the pivotal connection of the forward end of the strap to the transverse support permits the strap and attached boom to swing about the last-mentioned pivotal attachment.

8. The apparatus of claim 7 wherein said straps, and their connections to the booms and transverse support, are sufficiently strong to support the weight of the booms and associated tool bars and tools when the booms are otherwise unsupported.

9. In combination: a tractor provided with a hydraulically-actuated lift apparatus, and a tool-connecting apparatus for mounting to the lift apparatus, the lift apparatus comprising co-acting lifting arms extending forwardly along the sides of the tractor and joined forwardly of the tractor by a transverse lifting beam, the lifting arms being pivotally attached at their rearward ends to the tractor frame, the lift apparatus including a pair of forwardly extending hydraulic cylinders means supporting the booms joined at their rearward ends to the tractor, each cylinder having a piston extending forwardly thereof and a pair of generally forwardly extending and diverging links each pivotally mounted at one end to the piston, one of the links being pivotally connected to the tractor frame and the other link being pivotally attached to an adjacent lifting arm, the links and cylinder being oriented with respect to the lifting arm such that the axis of force generated by the piston and cylinder passes within the oblique angle between the links, whereby forward force generated by the piston and cylinder causes the divergent ends of the links to separate, raising the associated lifting arm;
   the tool-connecting apparatus comprising a pair of transversely extending, longitudinal booms removably attached respectively to the lifting arms intermediate the length of the tractor and means supporting the booms against downward and rearward movement with respect to the lifting arms, and a pair of longitudinal tool-mounting bars attached respectively to, and in parallel relationship to, the booms.

10. The tool-connecting apparatus of claim 5 wherein the pair of supporting straps are respectively pivotally connected at their one ends to the respective booms so as to permit the booms to swing horizontally about said connection when otherwise unrestrained.

* * * * *

UNITED STATES PATENT OFFICE
CERTIFICATE OF CORRECTION

Patent No. 3,893,516          Dated July 8, 1975

Inventor(s) Emil F. Zimmerman

It is certified that error appears in the above-identified patent and that said Letters Patent are hereby corrected as shown below:

Column 7, lines 36 and 37 (claim 5), the word "upwardly" appearing after "connected" should be replaced with -- at --;

Column 8, lines 26 and 27, the phrase "means supporting the booms" should be deleted.

Signed and Sealed this sixteenth Day of September 1975

[SEAL]

*Attest:*

RUTH C. MASON
*Attesting Officer*

C. MARSHALL DANN
*Commissioner of Patents and Trademarks*